US007907385B2

(12) United States Patent
Korich et al.

(10) Patent No.: US 7,907,385 B2
(45) Date of Patent: Mar. 15, 2011

(54) LOW INDUCTANCE INTERCONNECT DEVICE FOR A POWER CAPACITOR COMPONENT

(75) Inventors: Mark D. Korich, Chino Hills, CA (US); David Tang, Fontana, CA (US); Mark L. Selogie, Manhattan Beach, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 420 days.

(21) Appl. No.: 12/172,777

(22) Filed: Jul. 14, 2008

(65) Prior Publication Data

US 2010/0008018 A1    Jan. 14, 2010

(51) Int. Cl.
*H01G 4/228* (2006.01)
(52) U.S. Cl. .................. 361/306.1; 361/306.3; 361/305; 361/502; 361/504; 361/512
(58) Field of Classification Search ............... 361/306.1, 361/306.3, 303–305, 311–313, 321.1, 321.2, 361/502–504, 509–512; 174/17, 50
See application file for complete search history.

(56) References Cited

U.S. PATENT DOCUMENTS

| 6,855,885 | B1 * | 2/2005 | Schweikert ...................... 174/50 |
| 6,894,886 | B2 * | 5/2005 | Eriksson et al. ............ 361/301.5 |
| 7,408,764 | B1 * | 8/2008 | Mueller et al. ................ 361/502 |
| 7,474,520 | B2 * | 1/2009 | Kashihara et al. ............ 361/502 |
| 7,477,505 | B2 * | 1/2009 | Timmerman et al. ......... 361/502 |
| 7,667,952 | B2 * | 2/2010 | Allain et al. ................... 361/502 |

* cited by examiner

*Primary Examiner* — Nguyen T Ha
(74) *Attorney, Agent, or Firm* — Ingrassia Fisher & Lorenz, P.C.

(57) ABSTRACT

Systems and apparatus are provided for capacitor segments for use in a vehicle. A capacitor segment comprises an inner conductor configured to receive a first potential and having a generally L-shaped longitudinal cross-section. An outer conductor is configured to receive a second potential, and is electrically insulated from the inner conductor. The outer conductor comprises a first section having a generally L-shaped longitudinal cross-section aligned with the inner conductor, and a second section coupled to the first section and having a generally L-shaped lateral cross-section. The second section and the inner conductor define an inner region. A capacitor is located in the inner region and coupled to the inner conductor and the second section. The capacitor segment is configured such that current flows through the capacitor in a first direction, and current flows through the second section in a second direction that generally opposes the first direction.

20 Claims, 4 Drawing Sheets

LOW INDUCTANCE INTERCONNECT DEVICE FOR A POWER CAPACITOR COMPONENT

TECHNICAL FIELD

Embodiments of the subject matter described herein relate generally to interconnect devices for establishing electrical connections, and more particularly, embodiments of the subject matter relate to capacitor segments configured for low inductance by overlapping bus bars carrying current in opposing directions.

BACKGROUND

Capacitors are used in many power circuits or electrical systems to smooth voltage and/or current from one device or component to other devices or components. Often, one or more capacitors are connected in parallel between the electrical devices or components. The capacitor reduces current ripple during operation of the electrical system, for example, by compensating for an inductive load or absorbing voltage fluctuations or spikes caused by one of the devices. As the power rating (e.g., voltage level or current level) of the electrical system increases, more capacitance is often needed, which generally requires capacitors having increased volume.

In higher power applications, typically one or more bus bars are used to connect the capacitors to the electrical system. Often, these bus bars are flat sheets of an electrically conductive material, such as copper or aluminum. In order to accommodate higher power ratings and larger capacitors, the bus bars must also have a larger size. As a result of increasing the size of the bus bars, the inductance of bus bars increases. This added inductance has a negative impact on the electrical system and counteracts the capacitor. In switching applications where the current changes at a high rate with respect to time, the added inductance can cause voltage spikes, which may reduce reliability of the other components in the electrical system.

BRIEF SUMMARY

An apparatus is provided for a capacitor segment for use with a power module in a vehicle. The capacitor segment comprises an inner conductor configured to receive a first potential. The inner conductor has a generally L-shaped longitudinal cross-section. An outer conductor is configured to receive a second potential, and is electrically insulated from the inner conductor. The outer conductor comprises a first section having a generally L-shaped longitudinal cross-section aligned with the inner conductor, and a second section coupled to the first section, the second section having a generally L-shaped lateral cross-section. The second section and the inner conductor define an inner region. A capacitor is located in the inner region and coupled to the inner conductor and the second section. The capacitor segment is configured such that current flows through the capacitor in a first direction, and current flows through the second section in a second direction that generally opposes the first direction.

An apparatus is provided for an electrical device. The electrical device comprises an inner conductor having a generally L-shaped longitudinal cross-section. An outer conductor is physically coupled to, and electrically insulated from, the inner conductor. The outer conductor comprises a first section having a generally L-shaped longitudinal cross-section that generally conforms to the inner conductor, and a second section coupled to the first section. The second section has a generally L-shaped lateral cross-section, wherein the second section and the inner conductor define an inner region adapted to receive at least one capacitor element.

An apparatus for an electrical system is provided. The electrical system comprises a first bus bar, which is electrically conductive, substantially planar, and configured to receive a first potential. The electrical system further comprises a second bus bar, which is electrically conductive, substantially planar, and configured to receive a second potential. A dielectric material is located between the first bus bar and the second bus bar, such that the dielectric material electrically insulates the first bus bar from the second bus bar. A capacitor is coupled to the first bus bar and the second bus bar, wherein the first bus bar and the second bus bar are configured such that current flows through the first bus bar in a first direction, and current flows through the second bus bar in a second direction that generally opposes the first direction.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The following description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although the schematics and diagrams shown herein depict exemplary arrangements of elements, additional intervening elements, devices, features, or components may be present in an embodiment of the depicted subject matter.

In addition, certain terminology may also be used in the following description for the purpose of reference only, and thus are not intended to be limiting. For example, terms such as "inner" and "outer" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

For the sake of brevity, conventional techniques related to soldering, packaging, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Technologies and concepts described herein relate generally to interconnect devices for coupling capacitors to electrical systems using bus bars. The bus bars are arranged in a manner that reduces the total inductance of the interconnect device.

Figure 1:
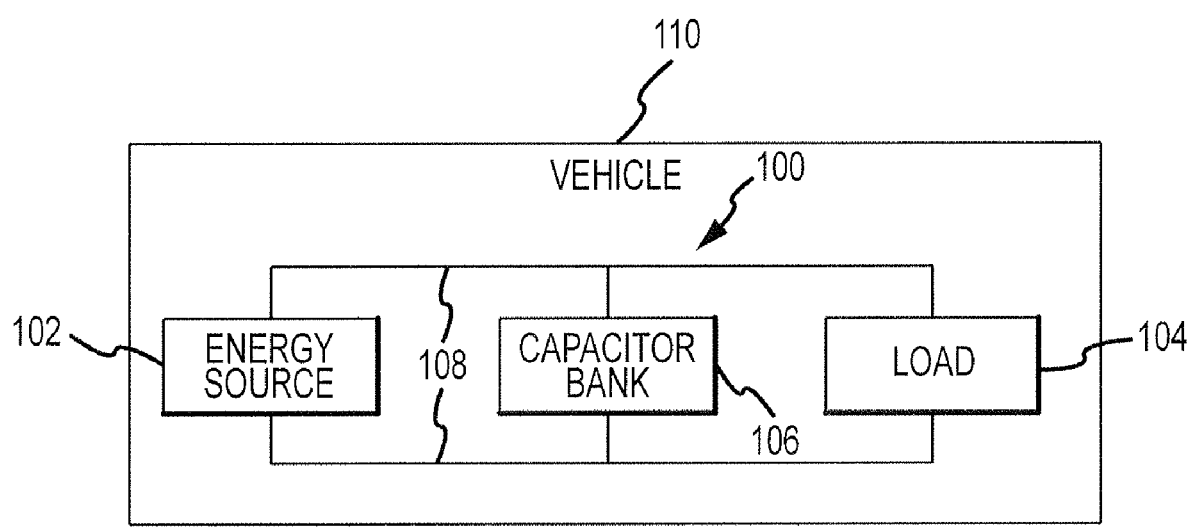
FIG. 1 is a block diagram of an exemplary electrical system in accordance with one embodiment.

Referring now to FIG. 1, in an exemplary embodiment, an electrical system 100 includes, without limitation, an energy source 102, an electrical load 104, and a capacitor bank 106. The elements of electrical system 100 may be interconnected together using a bus 108 or another suitable interconnection arrangement. In an exemplary embodiment, the electrical system 100 may be located within a vehicle 110, however, in practical embodiments, the topology and configuration of the electrical system 100 can vary to suit the needs of the particular application and FIG. 1 is not intended to limit the application or scope of the subject matter in any way. It should be understood that FIG. 1 is a simplified representation of an electrical system 100 for purposes of explanation and ease of description, and that practical embodiments will include numerous other devices and components to provide additional functions and features, as will be understood.

Depending on the embodiment, the vehicle 110 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD), or all-wheel drive (AWD). The vehicle 110 may also incorporate any one of, or combination of, a number of different types of engines, such as, for example, a gasoline or diesel fueled combustion engine, a "flex fuel vehicle" (FFV) engine (i.e., using a mixture of gasoline and alcohol), a fuel cell vehicle engine, a gaseous compound (e.g., hydrogen and natural gas) fueled engine, a combustion/electric motor hybrid engine, or an electric motor. In this regard, energy source 102 may be realized as a battery, a fuel cell, or another suitable voltage source. In an exemplary embodiment, the energy source 102 provides DC electrical energy to the electrical system 100.

In various embodiments, the electrical load 104 may be realized as a power module (e.g., an inverter, a DC-to-DC converter), an inductive load, or another suitable electrical device or component. In an exemplary embodiment, the electrical load 104 is an inverter power module configured to utilize high-frequency pulse width modulation (PWM) techniques to convert DC power from the energy source 102 and provide AC power to a motor or another device within the vehicle 110, as will be understood.

In an exemplary embodiment, the capacitor bank 106 comprises one or more capacitors or other capacitive elements, which may be configured electrically in series or parallel. In an exemplary embodiment, the capacitor bank 106 is realized as a plurality of capacitors configured electrically in parallel. In practice, the total capacitance of the capacitor bank 106 will vary according to the needs of a given electrical system 100, as will be understood. When used in a vehicle 110 with an inverter power module, the capacitance of the capacitor bank 106 generally ranges from 300 to 2000 microfarad.

In an exemplary embodiment, the bus 108 may be realized as a pair of bus bars. Depending on the embodiment, each of the bus bars may be realized as a sheet or plate of copper or another conductive material. In accordance with one embodiment, a first of the bus bars is coupled to and/or configured to receive a positive voltage potential from the energy source 102 (e.g., the supply conductor), and a second bus bar is coupled to and/or configured to receive a negative voltage potential from the energy source 102 (e.g., the return conductor). In an exemplary embodiment, the bus bars are sized to allow coupling to the capacitor bank 106, and also to accommodate the power rating (or current rating) of the electrical system 100. The bus bars may be packaged together or located near each other to achieve space savings. For example, the bus bars may be arranged to accommodate a vehicle 110 form factor (e.g., for packaging under the hood of an automobile). In an exemplary embodiment, the bus bars are separated by an insulating layer, which electrically insulates the bus bars. In an exemplary embodiment, the insulating layer is realized as a dielectric material, such as polyethylene naphthalate (PEN), polyethylene terephthalate (PET), polyimide film, or another suitable material.

In an exemplary embodiment, the bus bars have an inductance (L) by virtue of their geometry and spatial relationship by virtue of Faraday's law of induction, as will be appreciated in the art. For the exemplary embodiment shown, the inductance is governed by the relationship $$L = k\frac{\ell a}{b},$$

where k is a constant based on the conductive material, l is the length of the bus bar measured in the direction of current flow, b is the width of the bus bar, and a is the distance between conductors (e.g., the thickness of the insulating layer between two bus bars). By virtue of this inductance, varying or fluctuating current (e.g., increased magnitude of $$\frac{di}{dt}\Big)$$

induces a voltage $$\left(V = L\frac{di}{dt}\right)$$

into the electrical system 100, as will be appreciated in the art. In an exemplary embodiment, each individual bus bar has a respective inductance, which may be summed to determine a total inductance for the bus 108, as will be appreciated in the art.

Figure 2:
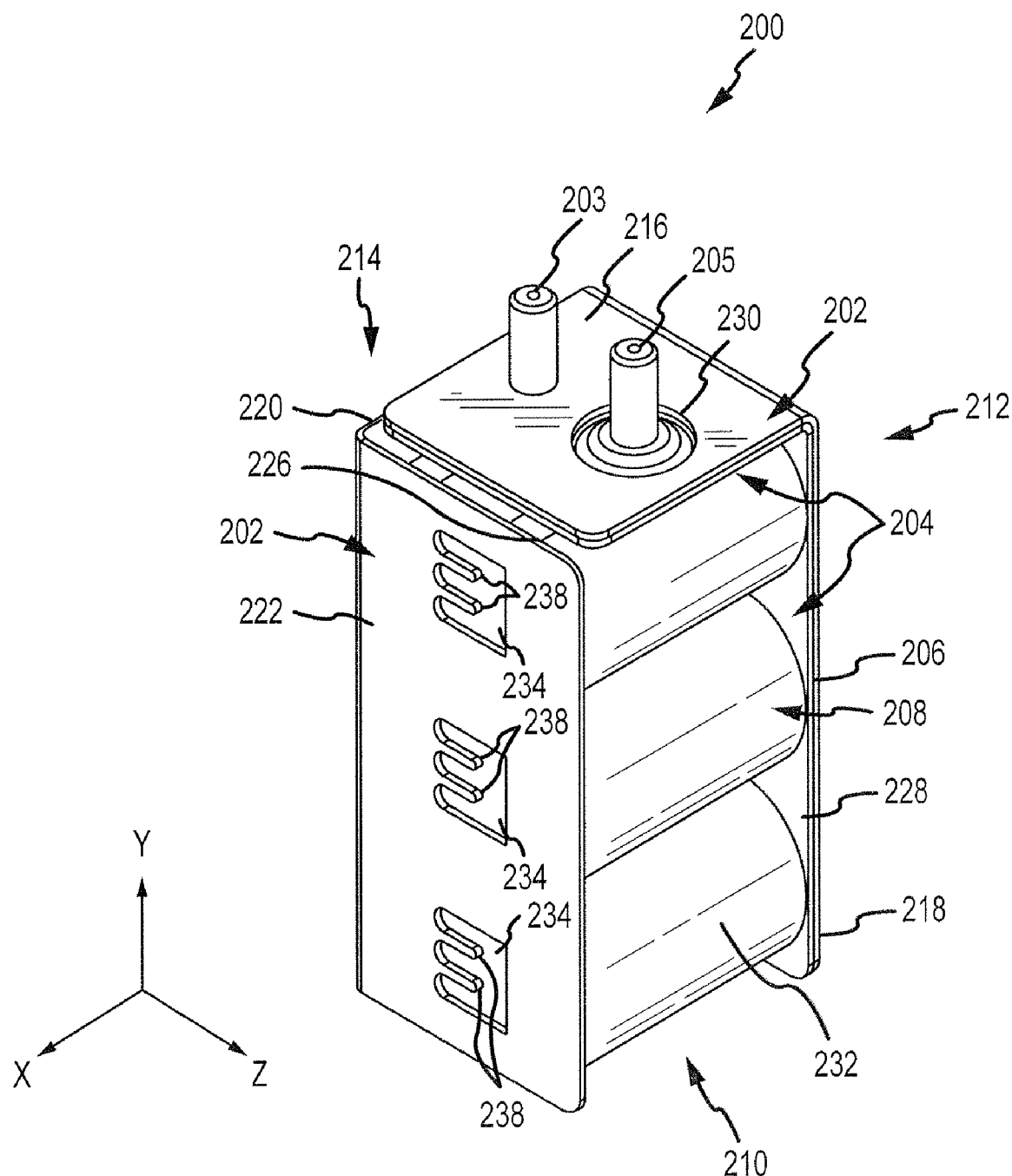
FIG. 2 is a perspective view of an exemplary embodiment of a capacitor segment suitable for use in the electrical system of FIG. 1.

Referring now to FIGS. 2-5, in an exemplary embodiment, a capacitor segment 200 includes an outer bus bar 202, an inner bus bar 204, a dielectric material 206, and at least one capacitor element 208. The three-dimensional (x-y-z) reference coordinates shown in FIGS. 2-5 are used for illustrative purposes and for ease of description. The bus bars 202, 204 may include terminals 203, 205 configured to receive a voltage potential and/or current for coupling the capacitor segment 200 to one or more circuit elements. It should be understood that although the capacitor segment 200 may be referred to herein as having a single capacitor element 208 for ease of description, in practice, any number of capacitor elements may be present to suit the needs of a particular application and FIG. 2 is not intended to limit the application or scope of the subject matter in any way.

In an exemplary embodiment, the dielectric material 206 is capable of providing electrical isolation between the two bus bars 202, 204. Moreover, the dielectric material 206 may be configured to physically couple the outer bus bar 202 and the inner bus bar 204, as described below. In an exemplary embodiment, the outer bus bar 202 includes a section (e.g., section 212) that generally conforms to at least a portion of the inner bus bar 204 (e.g., section 224), as described in greater detail below. The inner bus bar 204 and outer bus bar 202 define an inner region 210 that is suitably sized and shaped to receive the capacitor element 208. The capacitor element 208 is located in the inner region 210, and is coupled to each bus bar 202, 204, as described in greater detail below.

Figure 3:
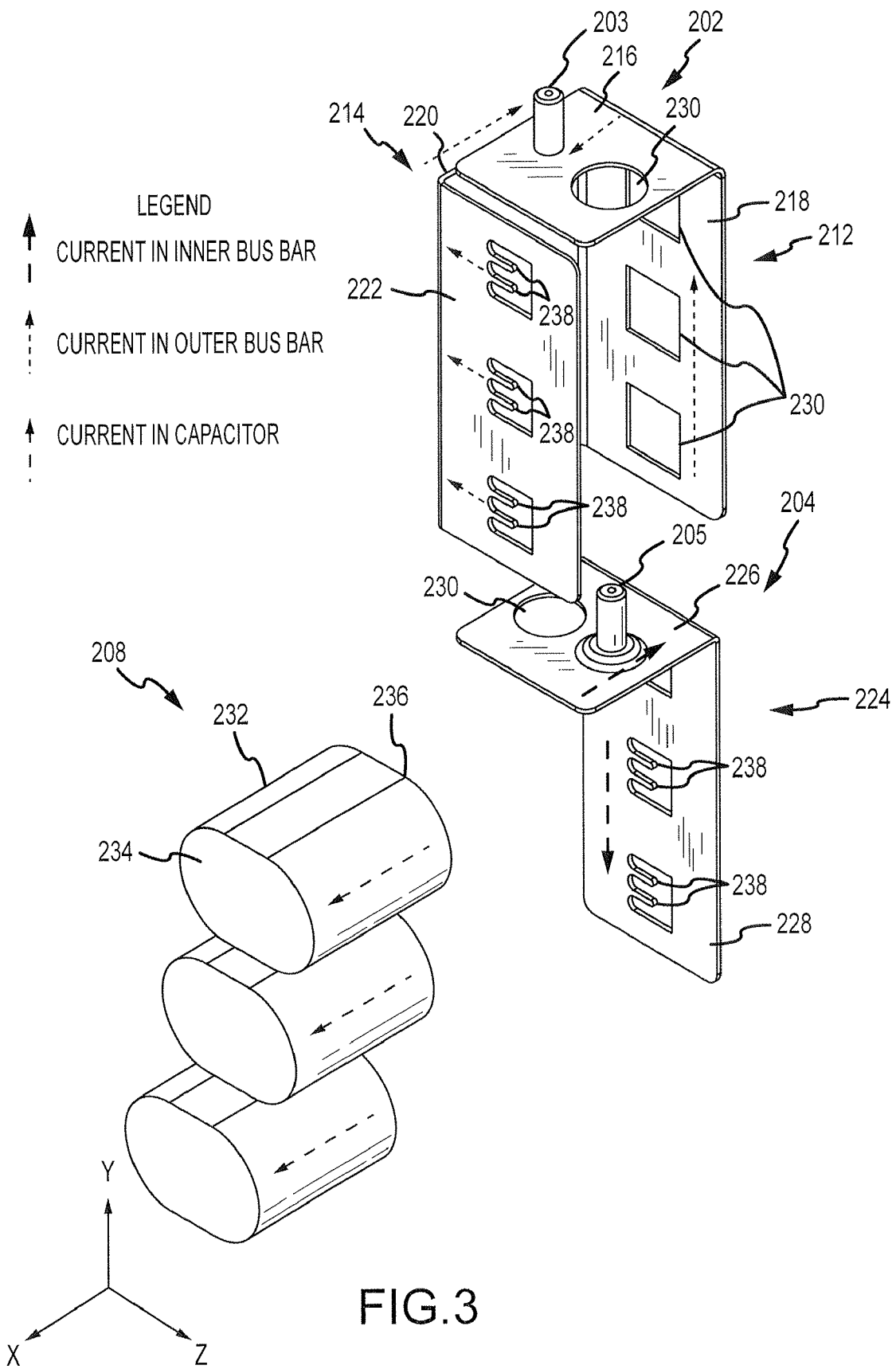
FIG. 3 is an exploded perspective view of the capacitor segment of FIG. 2.

Referring now to FIG. 3, and with continued reference to FIG. 2, in an exemplary embodiment, the outer bus bar 202 (or outer conductor) is electrically conductive and configured to receive a voltage potential (e.g., via terminal 203). In accordance with one embodiment, the outer bus bar 202 is configured to be coupled to a positive voltage potential (e.g., coupled to a positive terminal of energy source 102). In an exemplary embodiment, the outer bus bar 202 comprises a first section 212 having a generally L-shaped longitudinal cross-section (e.g., along the x-y plane) including a first planar segment 216 coupled to a second planar segment 218. In one embodiment, terminal 203 is integral with and/or coupled to the first planar segment 216 for receiving a voltage as shown. The outer bus bar 202 also comprises a second section 214 having a generally L-shaped lateral cross-section (e.g., along the x-z plane) including a third planar segment 220 coupled to a fourth planar segment 222. It should be understood that as used herein, planar segment refers to an element or segment that is substantially planar with some thickness (e.g., a planar segment may be three-dimensional). Furthermore, the embodiment shown is merely one preferred embodiment, and in practice, the bus bar segments may have various shapes and sizes, and they need not be planar. In an exemplary embodiment, the fourth planar segment 222 is configured to be coupled to one or more capacitor elements 208, as described in greater detail below.

In the exemplary embodiment shown in FIG. 2 and FIG. 3, the second planar segment 218 and the fourth planar segment 222 are substantially parallel to each other (e.g., both substantially parallel to the y-z plane), and substantially perpendicular to the third planar segment 220 (e.g., the third planar segment 220 is substantially parallel to the x-y plane). In accordance with one embodiment, the first planar segment 216 may be substantially perpendicular to the second planar segment 218 (e.g., substantially parallel to the x-z plane). In an exemplary embodiment, the outer bus bar 202 is realized as a continuous body by joining, physically coupling, or otherwise integrating planar segments 216, 218, 220, 222. In accordance with one exemplary manufacturing process, the outer bus bar 202 is formed from a single sheet or plate of copper. It should be appreciated that although the segments 216, 218, 220, 222 of the outer bus bar 202 are shown to intersect at approximately right angles, in practice, the angles of intersection may vary depending upon the shape and size of the capacitor element 208 and the required form factor of the capacitor segment 200.

In an exemplary embodiment, the inner bus bar 204 or conductor is electrically conductive and configured to receive a voltage potential (e.g., via terminal 205). In accordance with one embodiment, the inner bus bar 204 is configured to be coupled to negative voltage potential (e.g., coupled to a negative terminal of energy source 102). The inner bus bar 204 comprises a section 224 having a generally L-shaped longitudinal cross-section (e.g., along the x-y plane) including a fifth planar segment 226 coupled to a sixth planar segment 228. In accordance with one embodiment, terminal 205 is integral with and/or coupled to the fifth planar segment 226 for receiving a voltage as shown.

When assembled together, the fifth planar segment 226 and the sixth planar segment 228 are aligned with the first section 212 of the outer bus bar 202. In such an embodiment, the fifth planar segment 226 is substantially parallel to first planar segment 216 and the sixth planar segment 228 is substantially parallel to second planar segment 218. In an exemplary embodiment, the inner bus bar 204 is realized as a continuous body by joining, physically coupling, or otherwise integrating planar segments 226 and 228. In accordance with one exemplary manufacturing process, the inner bus bar 204 is formed from a single sheet or plate of copper. It should be appreciated that although the segments 226, 228 of the inner bus bar 204 are shown to intersect at an approximately right angle (e.g., substantially perpendicular), that in practice the angle of intersection may vary depending upon the shape and size of the capacitor element 208 and the required form factor of the capacitor segment 200.

Referring again to FIG. 2 and FIG. 3, in an exemplary embodiment, the inner bus bar 204 and the outer bus bar 202 are generally conforming and physically coupled to each other such that they define an inner region 210. In an exemplary embodiment, the dielectric material 206 (not shown in FIG. 3) is realized as a thin sheet or film of polyethylene naphthalate that is lined on its exterior surfaces with an adhesive. The bus bars 202, 204 may be joined or affixed by placing the dielectric material 206 between them and pressing the bus bars 202, 204 together. In this regard, the respective bus bars 202, 204 may have cutout regions 230 (and the dielectric material 206 may have corresponding cutout regions), for example, to allow terminals 203, 205 of the other bus bar 202, 204 to protrude through or otherwise be electrically isolated from the respective bus bar 202, 204.

In an exemplary embodiment, the capacitor element 208 is a surface mountable capacitor having a body 232 with surface terminals 234, 236 on opposing sides of the body 232. A first surface terminal 234 is configured to receive a positive voltage potential, and a second surface terminal 236 is configured to receive a negative voltage potential. The first surface terminal 234 may be coupled to the outer bus bar 202 (e.g., fourth planar segment 222) and the second surface terminal 236 may be coupled to the inner bus bar 204 (e.g., sixth planar segment 228), such that the capacitor element 208 is located within the inner region 210. For example, the bus bars 202, 204 may include one or more finger-shaped regions 238 on the respective planar segments 222, 228 for soldering the capacitor element 208 to the bus bars 202, 204. As shown, the finger-shaped regions 238 are protrusions formed in the conductive material of the bus bar by cutting out the surrounding material, which are suitably sized for soldering. Current flows through the finger-shaped regions 238 in a direction away from the gap of conductive material (e.g., away from the solder joint and through the conductor), as will be appreciated in the art. The outer bus bar 202 may include cutout regions 230 aligned with the finger-shaped regions 238 of the inner bus bar 204 to allow access for soldering and to provide electrical isolation, as will be appreciated in the art. In accordance with one embodiment, the finger-shaped regions 238 are oriented to facilitate current flow in a particular direction, as described in greater detail below.

Figure 4:
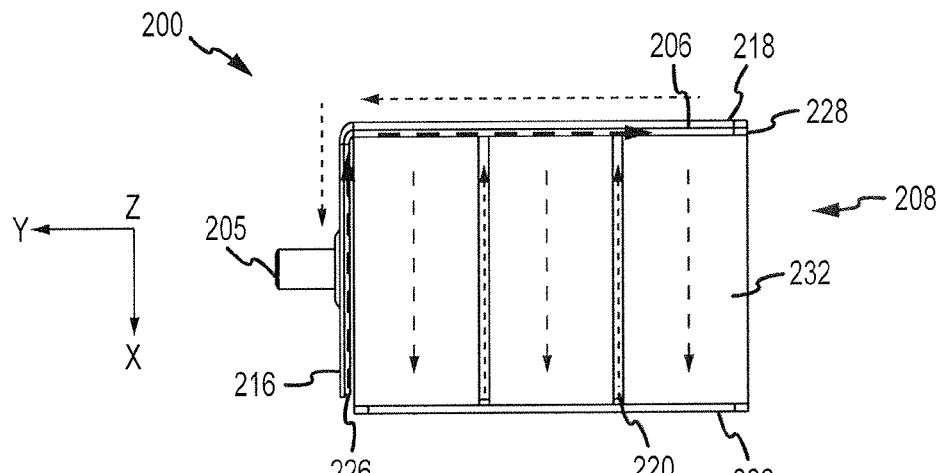
FIG. 4 is a side view of the capacitor segment of FIG. 2.
Figure 5:
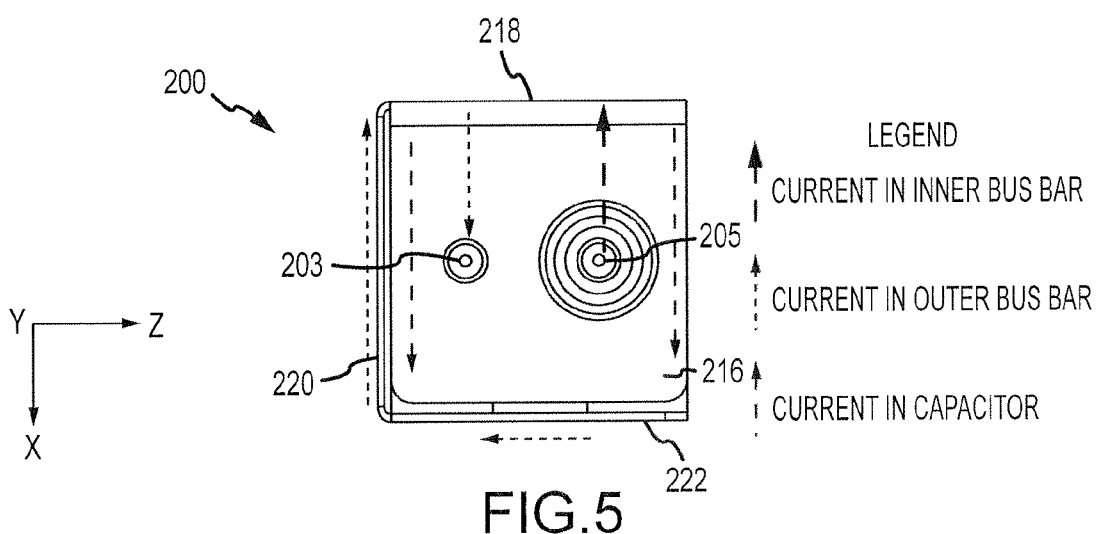
FIG. 5 is a top view of the capacitor segment of FIG. 2.

Referring now to FIG. 3, FIG. 4, and FIG. 5, and with continued reference to FIG. 2, in an exemplary embodiment, the capacitor segment 200 is configured to reduce the inductance of the bus bars 202, 204 by reducing the distance between elements that carry opposing currents (e.g., reducing a in the equation $$L = k\frac{\ell a}{b}\Big)$$

) and maximizing the overlap of elements with opposing currents (e.g., increasing b in the equation $$L = k\frac{\ell a}{b}\Big).$$

). It should be understood that although current may be described herein as flowing primarily in a particular direction, in reality, current does not travel uniformly throughout a device, element, or conductor. In this regard, current will be distributed unevenly throughout the device, element, or conductor, but generally or predominantly flows in the indicated direction.

For example, using the configuration as described above in the context of FIG. 2 and FIG. 3, assuming the outer bus bar 202 is coupled to a positive voltage and inner bus bar 204 is coupled to a negative voltage, current may flow through the body 232 of the capacitor element 208 in a generally positive direction along the x-axis. The capacitor segment 200 is configured such that current flows through a portion of the outer bus bar 202, e.g., third planar segment 220, and proximate the body 232 in a generally negative direction along the x-axis, thereby reducing the inductance of the third planar segment 220. In such a configuration, current flows through the fourth planar segment 222 in a generally negative direction along the z-axis. In accordance with one embodiment, finger-shaped regions 238 are oriented to facilitate current flow in the negative direction along the z-axis, as shown in FIG. 3. Accordingly, as a result of this configuration, current flows through the second planar segment 218 in a generally positive direction along the y-axis and current flows through the first planar segment 216 in a generally positive direction along the x-axis and from the outer bus bar 202 via terminal 203.

In an exemplary embodiment, the inner bus bar 204 is configured such that current through a portion of the inner bus bar 204 is in a direction opposite current flow through a corresponding portion of the outer bus bar 202. For example, the capacitor segment 200 is configured such that current flows into the inner bus bar 204 via terminal 205 and through the fifth planar segment 226 in a generally negative direction along the x-axis. In accordance with one embodiment, the fifth planar segment 226 may also be proximate the body 232, where current through the fifth planar segment 226 is in a direction opposite current through the capacitor element 208. Accordingly, current flows through the sixth planar segment 228 in a generally negative direction along the y-axis, which is opposite the direction of current through second planar segment 218.

Figure 6:
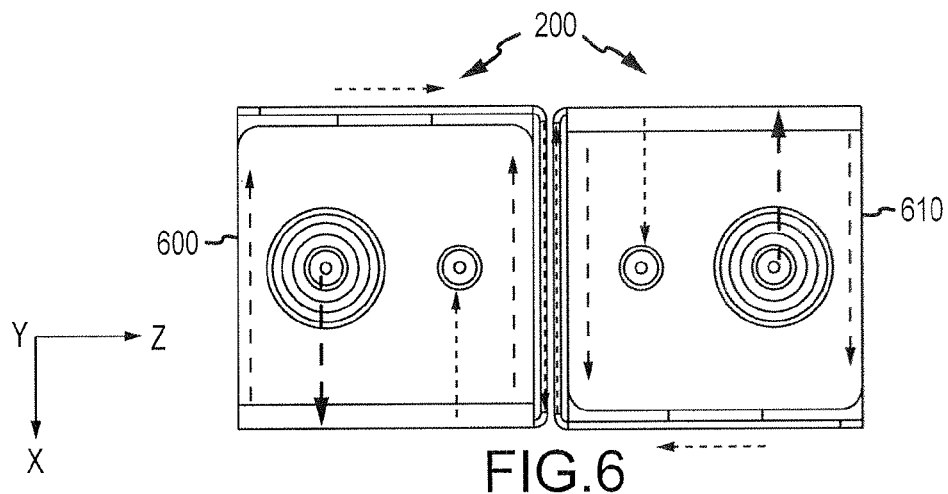
FIG. 6 is a top view of an exemplary configuration of capacitor segments in accordance with one embodiment.

Referring now to FIG. 6, depending on the embodiment, one or more capacitor segments 600, 610 may be utilized to achieve a required capacitance and/or accommodate various spatial constraints or form factors. In an exemplary embodiment, the capacitor segments 600, 610 are rotated 180° relative to one another, to achieve greater overlap of opposing currents and minimize the separation distance. For example, as shown, the capacitor segments 600, 610 are arranged such that the capacitor segments 600, 610 are adjacent, and the current through the adjacent planar segments are in opposing directions. Although not shown in FIG. 6, in a practical embodiment, a dielectric material may separate the capacitor segments 600, 610. It should be appreciated that any number of capacitor segments may be used and arranged in such an alternating configuration, or equivalents thereof, to achieve a desired capacitance or form factor while reducing the total inductance created by the bus bars 202, 204.

One advantage of the systems and apparatus described above is that the bus bar inductance is reduced, which reduces the voltage induced (e.g., voltage spike) when used in switching applications, such as with a PWM inverter power module. By reducing induced voltage, the electrical stress on the electrical devices or components in the system caused by unwanted voltage spikes is reduced. For example, in the case of an inverter, reducing inductance (and thereby the induced voltage from switching) helps to ensure the voltage rating of the switches in the inverter is not exceeded by voltage spikes, and thus improves overall system reliability. Furthermore, capacitor interconnect devices may be segmented in design and scalable to achieve various capacitance values and sizes, and thereby accommodate capacitance and form factor requirements for a variety of electrical systems. Other embodiments may utilize system and method described above in different types of automobiles, different vehicles (e.g., watercraft and aircraft), or in different electrical systems altogether, as it may be implemented in any situation where a low inductance bus interconnect is desired.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A capacitor segment for use with a power module in a vehicle, the capacitor segment comprising:
an inner conductor configured to receive a first potential, the inner conductor having a generally L-shaped longitudinal cross-section;

an outer conductor configured to receive a second potential, the outer conductor being electrically insulated from the inner conductor, the outer conductor comprising:
- a first section having a generally L-shaped longitudinal cross-section, the first section being aligned with the inner conductor; and
- a second section coupled to the first section, the second section having a generally L-shaped lateral cross-section, wherein the second section and the inner conductor define an inner region; and a capacitor located in the inner region, the capacitor being coupled to the inner conductor and the second section, wherein the capacitor segment is configured such that current flows through the capacitor in a first direction, and current flows through the second section in a second direction that generally opposes the first direction.

2. The capacitor segment of claim 1, wherein the capacitor includes:
- a first surface terminal coupled to the inner conductor; and
- a second surface terminal coupled to the second section, such that current flows through a body of the capacitor in the first direction.

3. The capacitor segment of claim 1, wherein the capacitor segment is configured such that current flows through the inner conductor in a third direction, and current flows through the first section in a fourth direction that generally opposes the third direction.

4. The capacitor segment of claim 3, wherein the inner conductor further includes a finger-shaped region suitable for soldering to a surface terminal on the capacitor, wherein the finger-shaped region is configured to support current flow in the third direction.

5. The capacitor segment of claim 1, wherein the second section further includes a finger-shaped region suitable for soldering to a surface terminal on the capacitor, wherein the finger-shaped region is configured to support current flow in the second direction.

6. The capacitor segment of claim 1, wherein the second section further comprises:
- a first planar segment configured to be coupled to the capacitor; and
- a second planar segment coupled to the first planar segment, the second planar segment being generally parallel to the capacitor, such that current flows through the second planar segment in the second direction.

7. The capacitor segment of claim 6, wherein the first section further comprises:
- a third planar segment coupled to the second planar segment; and
- a fourth planar segment coupled to the third planar segment, the fourth planar segment having a terminal configured to receive the second potential.

8. The capacitor segment of claim 7, wherein the inner conductor further comprises:
- a fifth planar segment configured to be coupled to the capacitor, the fifth planar segment being aligned with and substantially parallel to the third planar segment; and
- a sixth planar segment coupled to the fifth planar segment, the sixth planar segment having a terminal configured to receive the first potential, the sixth planar segment being aligned with and substantially parallel to the fourth planar segment, such that current flows through the fourth planar segment in a third direction, current flows through the sixth planar segment in a fourth direction generally opposite the third direction, current flows through the third planar segment in a fifth direction, and current flows through the fifth planar segment in a sixth direction generally opposite the fifth direction.

9. The capacitor segment of claim 8, wherein the fourth planar segment includes a cutout aligned with the terminal of the sixth planar segment, such that the terminal of the sixth planar segment protrudes through the cutout.

10. The capacitor segment of claim 1, further comprising a dielectric material between the inner conductor and the outer conductor, such that the dielectric material electrically insulates the inner conductor and the outer conductor.

11. The capacitor segment of claim 10, the dielectric material having an adhesive surface, wherein the dielectric material is configured to affix the inner conductor and the outer conductor.

12. An electrical device comprising:
- an inner conductor, the inner conductor having a generally L-shaped longitudinal cross-section; and
- an outer conductor, the outer conductor being physically coupled to, and electrically insulated from, the inner conductor, the outer conductor comprising:
  - a first section having a generally L-shaped longitudinal cross-section, the first section generally conforming to the inner conductor; and
  - a second section coupled to the first section, the second section having a generally L-shaped lateral cross-section, wherein the second section and the inner conductor define an inner region adapted to receive at least one capacitor element.

13. The electrical device of claim 12, wherein the inner conductor further comprises:
- a first planar segment configured to receive a first potential; and
- a second planar segment coupled to the first planar segment, the second planar segment being integral with the first planar segment to produce the generally L-shaped longitudinal cross-section.

14. The electrical device of claim 13, wherein the first section of the outer conductor further comprises:
- a third planar segment configured to receive a second potential, the third planar segment being generally parallel to and aligned with the first planar segment; and
- a fourth planar segment coupled to the third planar segment, the fourth planar segment being generally parallel to and aligned with the second planar segment, the fourth planar segment being integral with the third planar segment to produce the generally L-shaped longitudinal cross-section.

15. The electrical device of claim 14, wherein the second section of the outer conductor further comprises:
- a fifth planar segment coupled to the fourth planar segment; and
- a sixth planar segment coupled to the fifth planar segment, the sixth planar segment being integral with the fifth planar segment to produce the generally L-shaped lateral cross-section.

16. The electrical device of claim 15, further comprising a capacitor coupled between the second planar segment and the sixth planar segment, such that current flows through the capacitor in a first direction, current flows through the fifth planar segment in a second direction that generally opposes the first direction, current flows through the inner conductor in a third direction, and current flows through the first section in a fourth direction that generally opposes the third direction.

17. An electrical system comprising:
a first bus bar, the first bus bar being electrically conductive and configured to receive a first potential, the first bus bar being substantially planar;
a second bus bar, the second bus bar being electrically conductive and configured to receive a second potential, the second bus bar being substantially planar;
a dielectric material between the first bus bar and the second bus bar, such that the dielectric material electrically insulates the first bus bar from the second bus bar; and
a capacitor coupled to the first bus bar and the second bus bar, wherein the first bus bar and the second bus bar are configured such that current flows through the first bus bar in a first direction, and current flows through the second bus bar in a second direction that generally opposes the first direction.

18. The electrical system of claim 17, wherein current flows through the capacitor in a third direction, wherein the first bus bar includes a first section coupled to the capacitor, the first section having a planar segment substantially parallel to the third direction, such that current through the planar segment is in a direction generally opposing the third direction.

19. The electrical system of claim 18, wherein the first bus bar includes a second section coupled to the planar segment, the second section having a generally L-shaped longitudinal cross-section.

20. The electrical system of claim 19, wherein:
the second bus bar includes an inner conductor coupled to the capacitor, the inner conductor having a generally L-shaped longitudinal cross-section; and
the dielectric material includes a plurality of adhesive surfaces configured such that the second section of the first bus bar is affixed to the inner conductor, wherein the second section conforms to the inner conductor.

* * * * *